Fig. 1

Maurice C. Lucky
INVENTOR.

BY
Browning, Simms, Hyer & Eichenroht
ATTORNEYS

Aug. 16, 1966　　　　M. C. LUCKY　　　　3,266,341
DRIVE MECHANISM

Filed March 15, 1965　　　　　　　　　6 Sheets-Sheet 2

Fig. 2

Maurice C. Lucky
INVENTOR.

BY
Browning, Simms, Hyer & Eichenroht
ATTORNEYS

Fig. 3

Maurice C. Lucky
INVENTOR.

United States Patent Office 3,266,341
Patented August 16, 1966

3,266,341
DRIVE MECHANISM
Maurice C. Lucky, Houston, Tex., assignor to Cameron Iron Works, Inc., Houston, Tex.
Filed Mar. 15, 1965, Ser. No. 439,593
25 Claims. (Cl. 74—626)

This is a continuation-in-part of application Serial No. 265,892, filed March 18, 1963, now abandoned and entitled "Drive Mechanism."

This invention relates to drive mechanisms that can be either manually or power operated. It can be used in any application where a combination power and manual drive is desired. It has particular utility, however, in opening and closing valves, since with a combination manual and power operated drive mechanism the valve can be operated either remotely from a central control station or manually at the valve itself. The ability to also operate the valve manually is important as a necessary safety feature in case of a power failure.

Valves are power operated almost exclusively by either high speed air or electric motors. To keep these motors as small as possible and yet have sufficient power to operate the valve, motors having high speed and low torque power outputs are used in combination with speed reducers having high speed reduction ratios that convert the high speed, low torque power of the motor to the low speed, high torque power required to operate the valve. When it is desired to operate a valve manually, however, no such large speed reduction is necessary and, in fact, it is usually undesirable, since the power produced by manual operation of a handwheel is generally low speed, high torque power which can be used to operate the valve directly in most cases or, where the valve is large or difficult to operate, through a simple, relatively low ratio speed reduction. For these reasons, combination valve operators are provided with a speed reduction unit for use with the power means and some means for by-passing the speed reduction unit when the valve is operated manually. Heretofore, this arrangement has produced a cumbersome and bulky valve operator which usually had a plurality of brakes and levers which needed to be engaged and shifted to change the method of operating the valve.

It is an object of this invention to provide a drive mechanism that can be operated by either a handwheel or by a motor in which the power output of both is transmitted by one speed reducer.

It is another object of this invention to provide a combination manual and power operated drive mechanism in which the handwheel for manual operation and the motor for powered operation are both connected to a speed reduction unit which provides a direct drive for the handwheel and a speed reduction drive for the motor.

It is another object of this invention to provide a combination manual and power operated drive mechanism that employs one speed reduction unit to transmit both types of power and which employs a brake for changing the speed reduction ratio of the power transmitted through the speed reduction unit from substantially no reduction for manual operation to a substantial reduction for power operation.

It is a further object of this invention to provide a combination manual and power operated drive mechanism having a motor and a handwheel and a speed reduction unit which is so arranged that it has a compactness and simplicity heretofore not found in previous drive mechanisms of this type.

It is an additional object of this invention to provide a drive mechanism that is powered by either a motor or a handwheel wherein the handwheel is held stationary when the motor is providing the power but wherein the motor rotates with the handwheel when the mechanism is being manually operated.

The invention will now be described in detail in connection with the accompanying drawings in which.

In the drawings, the drive mechanism of this invention is shown arranged as a valve operator, which, as explained above, is where the invention is particularly useful. In the embodiment shown in FIG. 1, the drive mechanism generally indicated by the member 10 includes electric motor 16, handwheel 17, speed reduction unit 18 to which the motor and handwheel are connected, and brake 19. The drive mechanism is mounted on the housing 11 of a gear train by means of bolts 12. The gear train comprises a large drive gear (not shown) which drives the valve stem (not shown) of the valve (not shown). The drive gear is driven by pinion 14 through idler gear 13. Pinion 14 is driven by stub shaft 15 which is connected to output shaft 20 of the speed reducer. The ratio between the pinion and the drive gear is determined by the size of the valve and the service to which it is to be subjected. Generally, this gear train is designed so that the normal torque output from a handwheel can operate the valve without having to provide an excessively large handwheel. This type of arrangement is generally found only in the larger valves or valves that are to be used in high pressure service.

Figure 1:
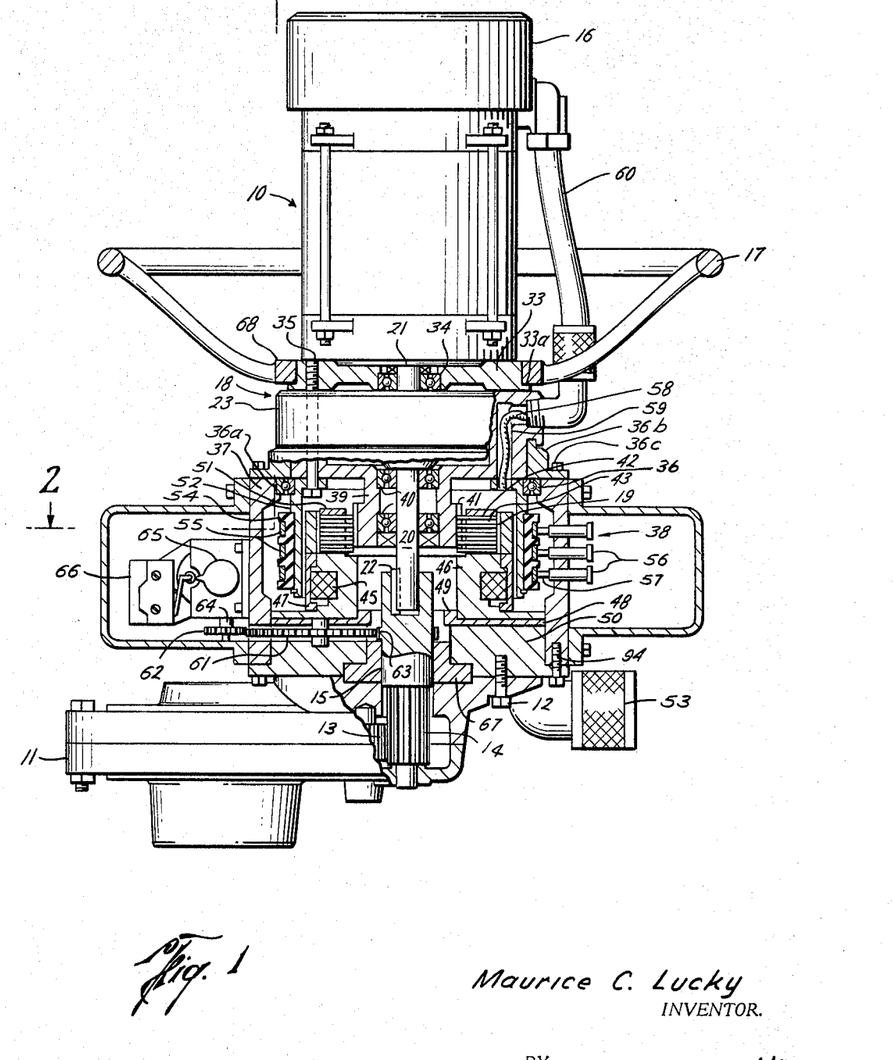
FIG. 1 is a view, partly in vertical cross section and partly in elevation, of one embodiment of the drive mechanism of this invention arranged as a valve operator which uses an electric motor for power operation and an electric brake.

Output shaft 20 of speed reduction unit 18 is connected to stub shaft 15 by means of key 22 so the power output of the unit will be transmitted to the gear train and operate the valve. Input shaft 21 of reduction unit 18 is connected to the rotor (not shown) of electric motor 16.

The speed reduction unit employed in this invention may be any type that is "self-locking" or "non-overhauling," i.e. the input shaft cannot be driven by the output shaft of the unit. This does not mean that the input shaft will not rotate when torque is applied to the output shaft as it frequently does due to vibration of the unit, etc. In the properly designed self-locking unit, this rotation is negligible.

An example of this type speed reduction unit is the worm and gear type of drive that is designed so that the gear cannot drive the worm. For compactness and simplicity, the preferred type of speed reduction unit is the epicyclic or planetary type that allows a large reduction in speed in a minimum of space. In addition, the epicyclic type of gear reduction unit usually allows the input shaft and the output shaft to be in line which, as will be seen later, allows the electric motor 16 to be located so that it can be rotated without creating unbalanced centrifugal forces.

An example of an epicyclic speed reducer of the preferred type is shown in U.S. Reissue Patent No. 17,811.

The upper end of the speed reduction unit housing 23 is closed by end plate 33 which is attached to the housing by bolts 35. Attached to the plate are both handwheel 17 and electric motor 16. The handwheel is provided with a hub 68 which encircles the plate and which is held against downward movement by shoulder 33a. The hub is attached to the plate by welding or some other convenient method so that rotation of the handwheel will cause rotation of the plate and housing 23 of the speed reduction unit. The end plate also houses bearings 34 which rotatably support input shaft 21.

Since electric motor 16 is conventional, it will not be described in detail. Suffice it to say that it comprises a stator section which is secured to end plate 33 by means of bolts (not shown) and a rotor section (not shown) which is connected to and drives input shaft 21 of the speed reduction unit.

The entire portion of the drive mechanism just described, comprising electric motor 16, handwheel 17 and speed reduction unit 18, is rotatably mounted on bearing 36 which is supported by annular brake housing member 37. A groove 36a is provided to support the outer race of bearing 36 and bearing cap 36b is bolted to the housing member by bolts 36c to hold the outer race in position on groove 36a and to prevent lateral movement of housing 23 relative to the bearing. Brake housing member 37 is attached to base plate 50 by bolts 94. The base plate is mounted on gear train housing 11 of the valve operating mechanism by bolts 12. The base plate also houses bearing 67 for the stub shaft 15.

Housing 23 of the speed reduction unit has a depending portion 39 which houses bearings 40 which rotatably support output shaft 20. The outer surface of this depending portion is provided with splines 41 which engage corresponding grooves in driven plates 42 of electric brake 19. Any of the well known types of electric brakes may be used to control rotation of the housing of the speed reduction unit. The electric brake illustrated includes a rotating section consisting only of driven discs 42 and a stationary section. Included in the stationary section are coil housing 46 and outer field ring 47 which are located on opposite sides of and support coil 45. Coil housing 46 is attached to plate 48 which supports the stationary section of the brake and, by means of circular boss 49, maintains the stationary section concentric with brake housing 37. Plate 48 is in turn attached to base plate 50 which supports the stationary section of the brake and holds it against rotation. Also a part of the stationary section of the brake are pressure plate 51 and brake discs 43 which are interposed between driven discs 42. The pressure plate is located above the discs so that when stationary coil 45 is energized, it creates a magnetic field in its housing 46 and outer field ring 47 to attract the pressure plate toward stationary coil 22, causing the brake discs to frictionally engage the driven discs and hold them against rotation. Since the lower end of the speed reduction unit's housing 23 is connected to the driven discs 42 by means of splines 41, when the brake is energized and the driven discs are held against rotation, housing 23 will be held against rotation also. The brake discs are prevented from rotating by the same bolts (not shown) which connect pressure plate 51 to the stationary section of the brake.

Encircling the electric brake and connected to speed reduction unit housing 23 by means of bolts 35 is a depending annular member 52 which serves to support the commutator assembly by which electrical energy is supplied to the electric motor. Since the coil of the electric brake is stationary, it is supplied with electrical energy directly through a conductor (not shown) located in conduit 53. Since electric motor 16, however, may be rotated several times by handwheel 17 during manual operation of the valve, commutation means are provided so that electrical energy can be transmitted to the electric motor regardless of the position in which the handwheel leaves the assembly.

The commutator assembly is conventional and consists of an annular, non-conductive ring 54 which is carried by annular member 52 and which has embedded therein a plurality of electrically conductive rings 55. For a three-phase motor, of course, three of these rings are necessary whereas for a single phase motor, only two would be required. Brush assemblies 56 are arranged so that carbon shoes 57 are resiliently urged into contact with commutator rings 55. Electrical power is supplied to the brush assemblies by conventional conductors (not shown) and is conducted from the commutator rings to the electric motor by conductors 58 located in opening 59 of housing 23 and conduit 60.

Means are provided to protect the valve from overtravel in either direction. In the arrangement illustrated, this is accomplished by a gear train comprising gears 61 and 62 which are driven by teeth 63 formed on stub shaft 15. This gear train in turn drives shaft 64 carrying a plurality of cams 65. These cams are arranged on the shaft in such a way that they will close and open limit switches 66 at various positions of the valve. These switches can be used to stop the motor when the valve reaches open or closed position and to signal various positions of the valve between open and closed.

*Operation*

For power operation, electrical energy is supplied simultaneously to motor 16 and electric brake 19. Thus, housing 23 of the speed reducer and the stator section of the electric motor are held against rotation while the rotor of the motor turns input shaft 21 of speed reduction unit 18. The speed reducer changes the high speed, low torque power output of the electric motor to low speed, relatively high torque power. This power is then transmitted through output shaft 20 to stub shaft 15 and pinion 14 to drive the valve through whatever valve operating means with which the valve is equipped. When the valve reaches the desired position, a limit switch shuts the motor off and disengages the brake.

When electrical power is not being supplied to the electric motor and the brake, housing 23 of the speed reduction unit and electric motor 16 are free to be rotated on bearing 36 by handwheel 17. Since the speed reduction unit is self-locking, the rotation of housing 23 will be imparted directly to output shaft 20. Thus, the torque of handwheel 17 will be transmitted directly to pinion 14 which drives the valve actuating means.

Figure 2:
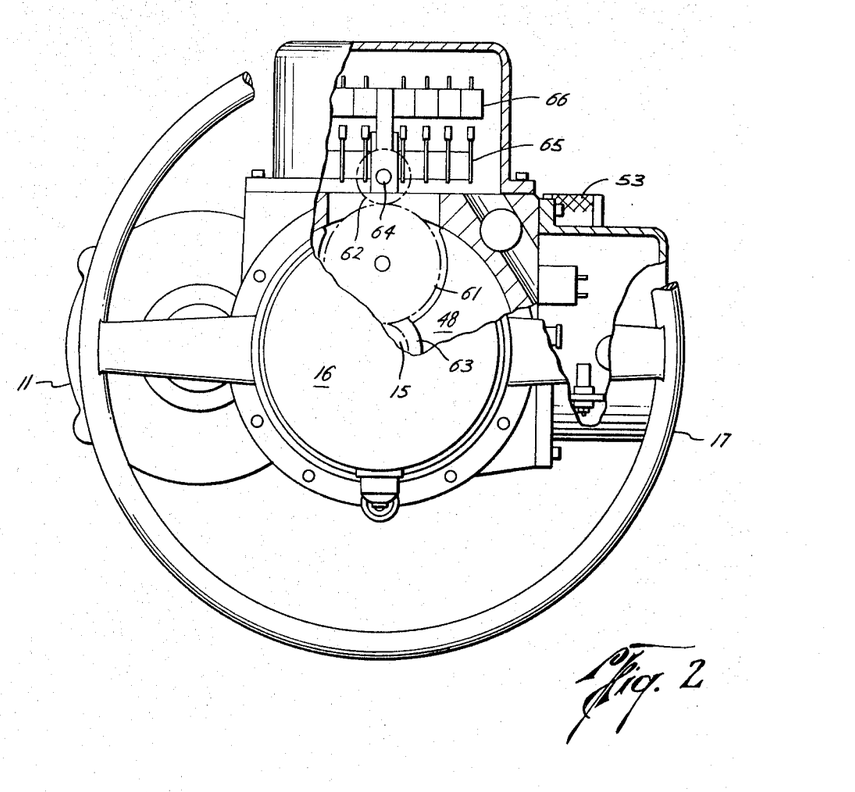
FIG. 2 is a top view of the drive mechanism of FIG. 1 with a portion of the housing broken away along line 2—2 of FIG. 1.
Figure 3:
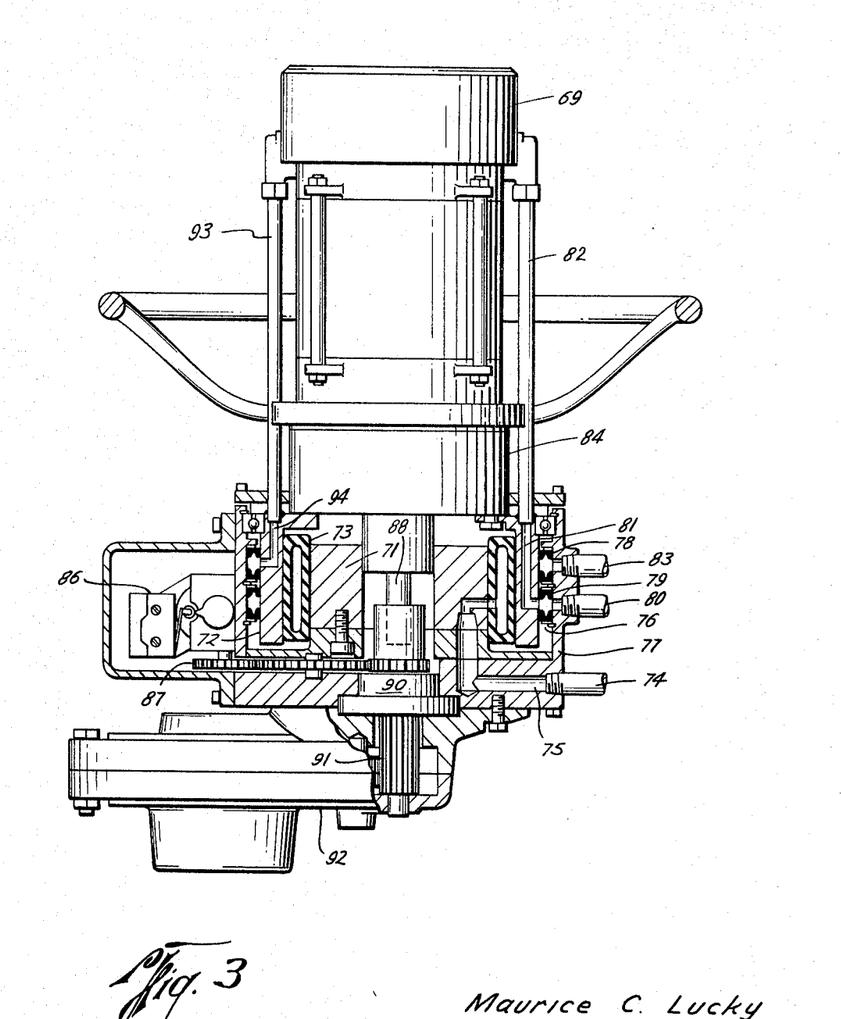
FIG. 3 is a view similar to FIG. 1 of another embodiment of the invention which employs a pneumatic motor for power and a pneumatic brake.

An alternate embodiment of the drive mechanism of this invention is illustrated in FIG. 3. It differs from the embodiment described above and shown in FIGS. 1 and 2 in that the electric means have been replaced by pneumatic means. Any well known air brake may be used. The one illustrated has a stationary section 71 and a rotating or moving section 72. Located between these two sections is an inflatable circular tube 73 to which air can be supplied by means of connection 74 and passageway 75. To provide a rotating connection by which air is supplied to and exhausted from air motor 69, rotating section 72 is spaced from its housing 77 to provide an annular space 76. In this annular space, two sets of seals 78 and 79 are located so that air entering line 80 will be confined between seals 79 and forced to enter an opening 81 in moving section 72 of the air brake. Opening 81 in turn leads to line 82 which is connected to air motor 69. An exhaust line 93 is connected from the air motor to a second passageway 94 in moving section 72 which connects line 93 to the space between seals 78 which is connected to line 83. To reverse the motor, air is supplied to line 83 and exhausted through line 80. A pneumatic limit switch assembly 86 is provided along with gear train 87 to operate valves in air lines 74, 80 and 83 and thereby control the amount of travel of the valve in either direction. Operation of this unit will not be described in detail since it is deemed obvious from the description set out above in connection with the electrical unit.

The use of electric and pneumatic brakes as in the embodiments just described, provides a convenient method for controlling the amount of torque transmitted to the valve operating means. Both the electric brake and the air brake can be adjusted so they will slip when the torque output of the speed reducer reaches a predetermined amount. This will prevent the valve or the drive mechanism from being damaged should the valve encounter an obstruction when it is being closed or opened, or should the limit switches fail and not stop the motor at the proper time.

Figure 4:
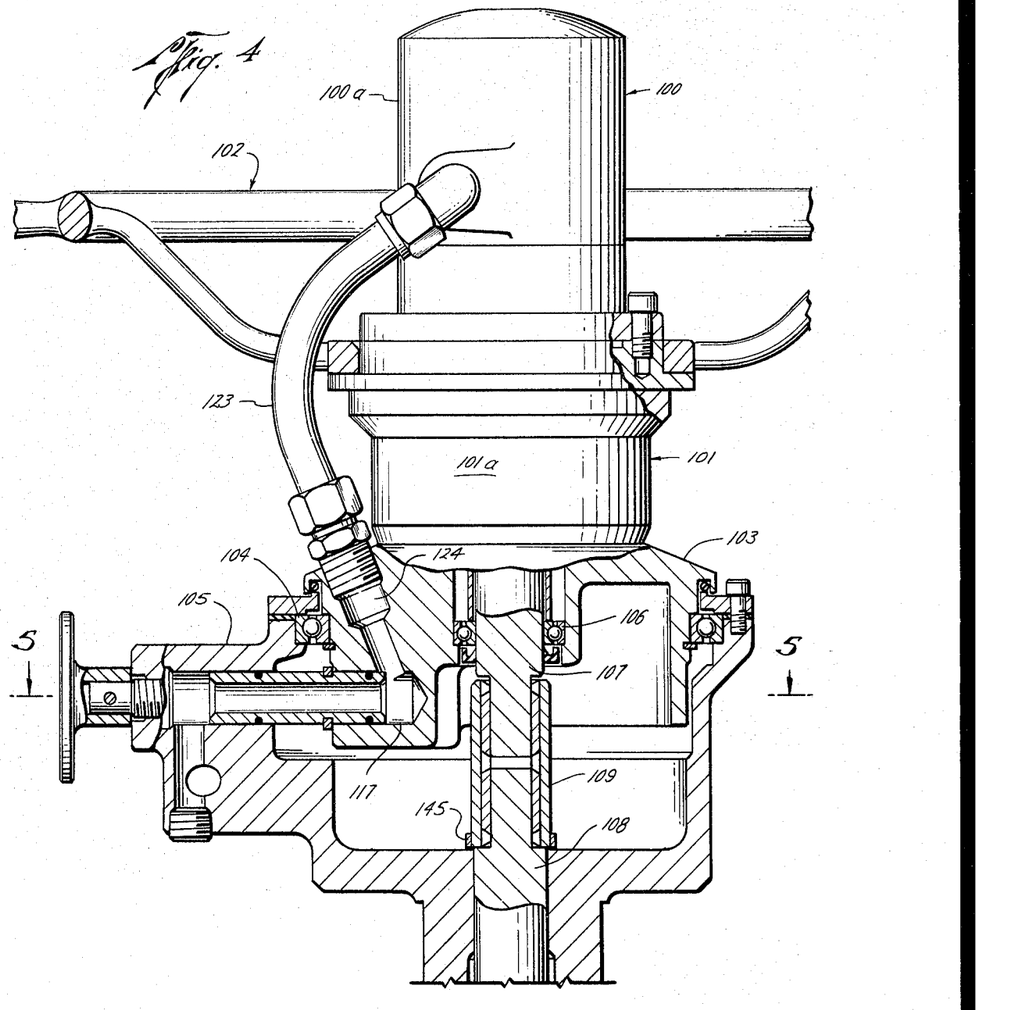
FIG. 4 is a view partially in vertical section and partially in elevation of another embodiment of the invention which employs a pneumatic motor for power and a manually actuated brake.
Figure 5:
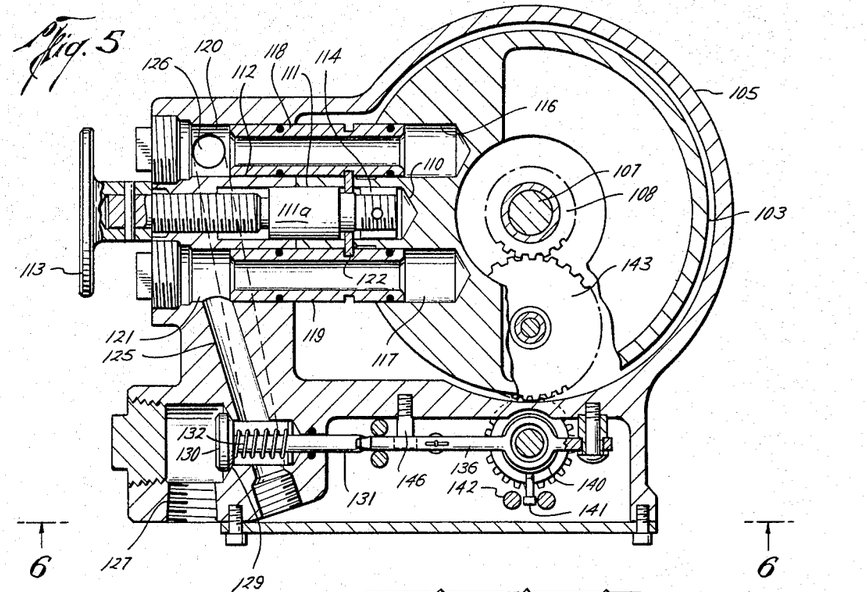
FIG. 5 is a sectional view taken along line 5—5 of FIG. 4.
Figure 6:
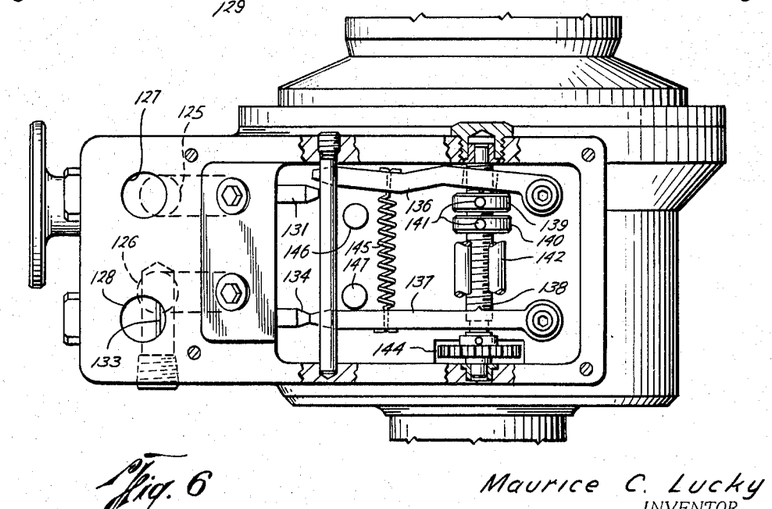
FIG. 6 is a sectional view taken along line 6—6 of FIG. 5.
Figures 7, 8:
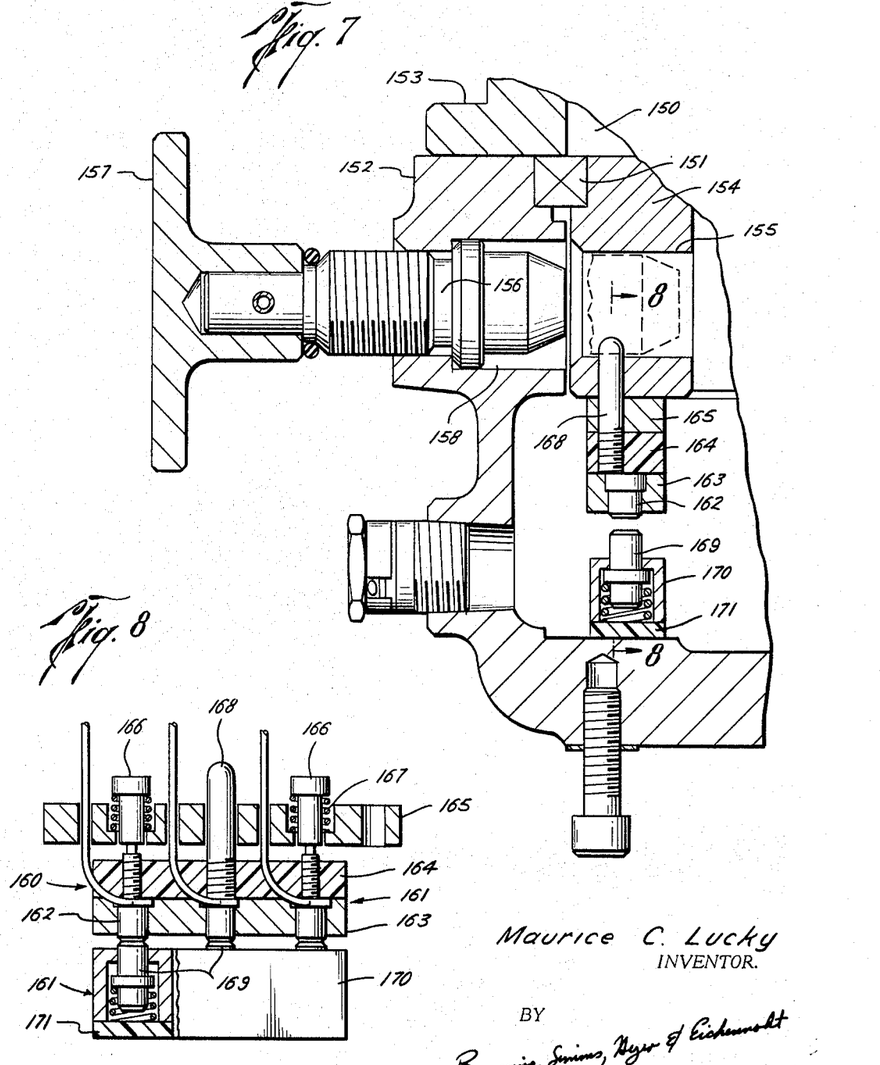
FIG. 7 is a partial vertical sectional view of another type of manually operated brake that can be used with the embodiment of FIG. 1.
FIG. 8 is a sectional view along line 8—8 of FIG. 7 showing the electrical switch that connects the electric motor of the drive mechanism to a source of electrical power when the brake of FIG. 7 is engaged.

FIGURES 4 through 8 illustrate two additional embodiments of the drive mechanism of this invention wherein a manually operated brake is used instead of the electric and pneumatic brakes described above. FIGURES 4, 5 and 6 illustrate one embodiment employing such a brake with a pneumatic motor and FIGURES 7 and 8 illustrate an embodiment employing a similar brake with an electric motor.

The embodiment shown in FIGURES 4 through 6 includes a pneumatic motor 100, which has its stator portion 100a mounted on housing 101a of speed reduction unit 101 in the same manner as described above in connection with the embodiment shown in FIGURE 1. The speed reduction unit is of the non-overhauling type such as the one illustrated in FIGURE 1. Also like the embodiments described above, handwheel 102 is connected to housing 101a of the speed reduction unit so that rotation of the handwheel will rotate stator 100a and housing 101a of the speed reduction unit and impart rotation to output shaft 107 of the speed reduction unit. The speed reduction unit housing, the handwheel, and the motor are all supported for rotation by annular member 103, which is attached to housing 101a of the speed reduction unit. This member forms the rotating section of the brake to be described below and is supported for rotation on bearing 104. The bearing is supported by base member 105, which forms the stationary section of the brake.

Annular member 103 also provides support for output shaft bearing 106. The output shaft is connected to shaft 108, which transmits the power output of the speed reducer to a valve stem or to whatever apparatus the drive mechanism is connected through splined sleeve 109 which engages the splined adjacent ends of shafts 107 and 108.

As described above, in this embodiment, annular member 103 is the movable section and base member 105 is the stationary section of a brake for holding housing 101a of the speed reduction unit and the stator of pneumatic motor 100 against rotation during the power operation of the drive mechanism. The annular member is provided with a laterally extending socket 110, as shown in FIGURE 5, to receive brake member 111, which is threadedly mounted in opening 112 in the base member 105. The central portion 111a of the brake member closely fits opening 112 to guide the brake member as it moves longitudinally in the opening upon rotation of the brake member by handle 113. Thus, when the brake member is located in socket 110 as shown in FIGURE 5, it will hold member 103, the rotatable section of the brake, the housing of the speed reduction unit, and the stator of the motor against rotation. For manual operation of the drive mechanism, rotation of handle 13 will remove the brake member from socket 110 and allow the free rotation of member 103, the handwheel, the stator of the motor, and the housing of the speed reduction unit to thereby impart the torque output of the handwheel without reduction to output shaft 107 of the speed reducer in the manner described above.

A cap 114 is threadedly connected to the inner end of brake member 110 and has an outside diameter such that it closely fits socket 110 to reduce the amount of backlash in the brake when the direction of rotation of the motor is reversed. This cap, preferably, is made from a hardened material to increase the life of the brake.

Motor 100 is supplied with air pressure to power the drive mechanism by means of two additional sockets 116 and 117 that are located on opposite sides of socket 110 parallel thereto. Positioned to enter sockets 116 and 117, as brake member 111 enters socket 110, are two flow tubes 118 and 119, which are reciprocally mounted in openings 120 and 121 in base member 105. The flow tubes are provided with seals to keep air from escaping between them and openings 120 and 121 and sockets 116 and 117 when the flow tubes are inserted in the sockets. The flow tubes are moved into the sockets by connection to brake member 111 through washer 122 which is carried by the brake member and which engages annular grooves in the flow tubes so any longitudinal movement of the brake member will cause a like movement in the flow tubes. Preferably, the brake member will enter socket 110 before the flow tubes enter their respective sockets.

After manual operation, it will not be readily apparent just where socket 110 is located with respect to the brake member. Thus, an indexing mark may be inscribed on some appropriate location on housing 101a of the speed reduction unit or the outside of rotating member 103 for alignment with a similar mark on base member 105 to indicate when sockets 110, 116 and 117 are properly aligned with the brake member and the flow tubes.

Air is supplied to motor 100, when the brake is engaged, through one of the flow tubes and exhausted through the other. Two flow tubes are provided so the flow of pressure fluid through the motor can be reversed to reverse the direction of rotation of the motor. Each flow tube socket is connected to motor 100 by a fluid conduit, in the manner shown in FIGURE 4, where socket 117 is connnected to conduit 123 through passageway 124. Openings 120 and 121 in base 105 in which the flow tubes are located are connected to either a source of pressure fluid or to the exhaust system through passageways 125 and 126 and ports 127 and 128.

Valve means are also provided to stop the flow of pressure fluid to the motor when the output shaft has rotated a given number of revolutions in a given direction. This automatically stops the rotation of motor 100 when the device being driven, such as a valve, has reached the end of its travel in one direction or the other. Preferably, when driving a valve, the flow of pressure fluid to the motor is not completely shut off, but is greatly reduced in pressure and volume to ease the valve into its closed or open position as the case may be.

As shown in FIGURE 5, passageway 125 is connected to port 127 through valve seat 129. Valve member 130 is located to move into and out of engagement with the valve seat to control the flow of air from port 127 to passageway 125. The valve member is connected to a valve stem 131 which extends outside of the base member. Coil spring 132 is positioned to urge the valve member away from the seat, but the strength of the spring is not such as to interfere with the closing of the valve when the flow of gas is from port 127 toward passageway 125. Passageway 126, which connects flow tube 118 with port 128 is provided with a similar valve and seat arrangement to control the flow of operating fluid from port 128 to passageway 126. In the drawings only valve member 133 and valve stem 134 of this valve are shown.

Means are provided to hold the valve members off their seats until the device being driven by the drive mechanism reaches the desired position at which time the valve in whichever passage is the inlet passage is allowed to close to substantially shut off the flow of air to the motor. In the embodiment shown, arms 136 and 137 are mounted on the side of the base member to pivot on axes that intersect and are perpendicular to the longitudinal axes of valve stems 131 and 134 to engage the valve stems and hold the valve members off their seats. To move one of the arms out of alignment with a valve stem and allow a valve to close at the proper time, lead screw 138 is provided with nuts 139 and 140 for movement up and down the lead screw as the lead screw is rotated. The nuts are held against rotation relative to the lead screw by set screws 141 which ride between guide posts 142.

Driving the lead screw are gears 143 and 144 which are rotated by gear teeth 145 on the outer periphery of splined sleeve 109, as shown in FIGURE 4. Thus, rotation of the output shaft of the drive mechanism will cause a corresponding rotation of lead screw 138 and the upward or downward movement of nuts 139 and 140 on the lead screw depending upon the direction of rotation of the output shaft.

As the nuts move up and down they engage pivot points on arms 136 and 137 and move one or the other out of alignment with a valve stem allowing one of the valves to close.

By properly positioning nuts 139 and 140 on the lead screw the drive motor can be stopped after a predetermined number of turns of the output shaft in either direction. When the drive mechanism is operating a valve for instance, nut 139 can be positioned to move arm 136 out of alignment with valve stem 131 allowing valve member 129 to close off the flow of air from port 127 to passageway 125, stopping the operation of the motor when the valve is closed. Conversely nut 140 can be positioned on the lead screw to move arm 137 out of alignment with stem 134 allowing valve member 133 to close off the flow of air from port 128 to passageway 126 when the valve is fully open.

Assume, for example, that the drive mechanism is operating a valve which is closed and, as shown in FIGURES 5 and 6, nut 139 has moved arm 136 out of alignment with valve stem 131, allowing valve member 130 to close off the passageway. When it is desired to open the valve, the flow of air will be reversed since the direction of operation of the motor is reversed, and air will be supplied through port 128, passageway 126, flow tube 118, etc., to the pneumatic motor causing it to rotate the valve toward the open position. This will also cause lead screw 138 to rotate in the proper direction to move nuts 139 and 140 downwardly toward arm 137. As the motor operates, air will be exhausted through flow tube 119 to passageway 125 and out port 127 and the air will move valve member 130 far enough from the seat to move valve stem 131 out of the way of arm 136, allowing it to move back in position in line with the valve stem as the nuts move downwardly. Coil spring 145 resiliently urges the arms toward each other and stops 146 and 147 hold them in position to engage the valve stems. As the valve approaches its full open position, nut 140 will engage arm 137 and move it out of alignment with valve stem 134. This will allow valve 133 to close off the flow of air from port 128 to the motor stopping its operation. As stated above, preferably these valves do not close off the flow of air completely but allow some small portion to continue to flow to the motor to maintain a positive torque on the valve and to insure that the valve does reach the desired position.

The embodiment of the drive mechanism shown in FIGURES 7 and 8 is powered by an electric motor and, like the one just described, has a manually operated brake. The electric motor, the speed reducer, and the handwheel of this embodiment are arranged in the same manner as the pneumatic motor, speed reducer, and handwheel in FIGURE 4 and therefore are not shown.

A portion of housing 150 of the speed reducer is shown in FIGURE 7. This housing is rotatably supported by annular base member 152 and bearing 151. Base member 152 also is the stationary section of the brake. Bearing cap 153 is provided to hold the bearing in place and the speed reducer in alignment therewith. Here also, as was the case in the embodiment shown in FIGURE 4, an annular member 154 is attached to the housing of the speed reducer and located within base member 152 to provide the movable section of the brake. This member is provided with a socket 155 into which brake member 156 can be inserted and removed. The brake member is located in opening 158 in the base member and threadedly connected thereto so that rotation of the brake member by handle 157 will cause it to move into and out of position in socket 155.

As shown in FIGURE 7, the brake member is out of engagement with the socket and the rotatable portion of the brake member 154 is free to rotate relative to the stationary portion. This is the position of the brake during manual operation of the drive mechanism. When the brake member is moved into the socket as indicated by the dotted lines, the brake member will hold the rotatable section of the brake against rotation relative to the stationary section and the motor can drive the output shaft of the drive mechanism.

Switch means are provided to connect the electric motor to a source of power when the brake is engaged and to disconnect the motor from the source of power when the brake is disengaged. In the embodiment shown, the engaging of the brake automatically closes the switch and the disengaging of the brake automatically opens the switch. The switch includes movable contacts assembly 160 and stationary contact assembly 161. The movable contact assembly is carried by the rotatable section of the brake member 154. It includes three contacts 162 that are mounted in upper contact block 163. The contact block is attached to carrier 164 of electrically non-conducting material, which is movably connected to upper mounting plate 165 through machine screws 166 and coil springs 167, as shown in FIGURE 8.

Threadedly connected to carrier 164 is cam pin 168 which is positioned to extend into socket 165 of the brake. The cam pin is provided with a rounded end and the brake member has a beveled end to engage the cam pin and force it downwardly as the brake member enters the socket. This forces contacts 162 into engagement with contacts 169 of the stationary contact assembly 161, completing the circuit from a power source to the electric motor. As the cam pin moves the carrier and contact block downwardly, screws 166 compress springs 167. These springs will then move the carrier and contact block upwardly when the brake member is moved out of the socket moving contacts 162 out of engagement with contacts 169 opening the switch.

The stationary contact assembly includes lower contact block 170 and lower mounting plate 171. Contacts 169 are spring mounted as shown in lower contact block 170 to take up any spacing errors which may exist between the contact assemblies when they are mounted in the drive mechanism.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A combination manual and power operated drive mechanism comprising, in combination, a self-locking speed reduction unit having a housing, an input shaft, and an output shaft, brake means having a stationary section and a rotatable section with the rotatable section attached to the housing of the speed reduction unit to hold the housing against rotation when the brake means are engaged, power means for driving the input shaft of the speed reduction unit when the brake means are engaged, means for mounting the housing of the speed reduction unit and the power means to prevent their having any relative motion, and means for manually rotating the housing of the speed reduction unit to drive the output shaft when the brake means are disengaged.

2. The combination of claim 1 further provided with means for simultaneously engaging the brake means and operating the power means.

3. The combination of claim 1 in which the rotatable section of the brake means is provided with a socket and the stationary section includes a member movable into and out of the socket to hold the rotatable section against rotation relative to the stationary member when the member is in the socket.

4. In a combination manual and power operated drive mechanism having a handwheel for manual operation and a motor for power operation, the motor having a stator and a rotor, the improvement comprising, a self-locking speed reduction unit having a housing connected to the handwheel and the stator of the motor, an input shaft driven by the rotor of the motor, and an output shaft, and a brake with a stationary section and a rotatable section which is held against rotation relative to the stationary section when the brake is engaged, the rotatable section being attached to the housing of the speed reduction unit to thereby allow the housing, the stator of the motor and the handwheel to freely rotate when the brake is disengaged and to hold the housing, handwheel and the stator against rotation when the brake is engaged.

5. The combination of claim 4 further provided with means for simultaneously engaging the brake and operating the motor.

6. The combination of claim 4 in which the rotatable section of the brake is provided with a socket and the stationary section includes a member movable into the socket to hold the movable section against movement relative to the stationary section and movable out of the socket to allow the movable section to rotate relative to the stationary section.

7. A drive mechanism comprising: driven means, brake means having a stationary portion and a rotatable portion, a self-locking speed reduction unit having a housing attached to the rotatable portion of the brake means, an input shaft, and an output shaft connected to the driven means, a motor having a stator mounted on the housing of the speed reduction unit and a rotor connected to the input shaft, means for engaging the stationary portion of the brake means with the rotatable portion thereof to hold the rotatable portion of the brake means, the housing of the reduction unit, and the stator of the motor, stationary when the motor is operative and manual operating means for rotating the housing of the speed reduction unit and the stator of the motor to thereby rotate the output shaft and the driven means when the motor is inoperative and the brake means are disengaged.

8. A drive mechanism comprising: driven means, a self-locking speed reduction unit having a housing, an input shaft and an output shaft, with the output shaft connected to the driven means, means for rotatably supporting the housing, a motor having a stator section connected to the housing of the speed reduction unit to prevent relative motion between them, and a rotor section attached to the input shaft of the speed reduction unit, a handwheel for rotating the housing of the speed reduction unit, and brake means for holding the housing of the speed reduction unit against rotation when the motor is operating.

9. The combination of claim 8 in which the motor and the brake means are electrically operated.

10. The combination of claim 8 in which the motor and the brake means are pneumatically operated.

11. In a combination manual and power operated drive mechanism having a handwheel for manual operation and a motor for power operation, the motor having a stator and a rotor, the improvement comprising: an epicyclic self-locking speed reduction unit having a housing connected to the handwheel and the stator of the motor, an input shaft driven by the rotor of the motor, and an output shaft, and a brake with a stationary section and a rotatable section which is held against rotation relative to the stationary section when the brake is engaged, the rotatable section being attached to the housing of the speed reduction unit to thereby allow the housing, the stator of the motor and the handwheel to freely rotate when the brake is disengaged and to hold the housing, handwheel and the stator against rotation when the brake is engaged.

12. The combination according to claim 11 in which the motor and the brake means are operated electrically.

13. The combination according to claim 11 in which the motor and the brake means are operated pneumatically.

14. The combination according to claim 11 in which the input shaft and the output shaft are located on the same vertical axis.

15. The combination of claim 11 in which the rotatable section of the brake is provided with a socket and the stationary section of the brake is equipped with a member movable into and out of the socket to hold the rotatable section against movement relative to the stationary section when the member is in the socket.

16. A drive mechanism comprising: a driven shaft, an epicyclic self-locking speed reduction unit including a housing, an input shaft, and an output shaft connected to the driven shaft, a motor having a stator connected to the housing of the speed reduction unit and a drive shaft connected to the input shaft of said unit, a manually operable member connected to said housing for rotating same, a brake having normally disengaged stationary and rotatable parts, the rotatable part being connected to the housing of the speed reduction unit, and means operable on actuation of the rotor of the motor to engage the stationary and rotatable parts of the brake.

17. The combination of claim 16 in which the motor is driven electrically.

18. The combination of claim 16 in which the motor is driven pneumatically.

19. The combination of claim 16 in which the input shaft and the output shaft are located on the central axis of the speed reduction unit.

20. A combination manual and power operated drive mechanism comprising, in combination, a self-locking speed reduction unit having a housing, an input shaft, and an output shaft, means rotatably supporting the housing, brake means for holding the housing against rotation including a rotatable section attached to the speed reducer housing and provided with a socket and a stationary section, a brake member mounted on the stationary section and movable into the socket to hold the rotatable section from rotating relative to the stationary section and out of the socket to permit the rotation of the rotatable section relative to the stationary section, power means for driving the input shaft of the speed reduction unit when the movable brake member is in the socket, means attaching the power means to the housing of the speed reduction unit, and means for manually rotating the housing of the speed reduction unit to drive the output shaft when the brake member is out of the socket.

21. A combination manual and power operated drive mechanism comprising, in combination, a self-locking speed reduction unit having a housing, an output shaft, and an input shaft, means rotatably supporting the housing, a pneumatic motor having a stator mounted on the housing and a rotor for rotating the input shaft, a brake for holding the housing against rotation when the motor is operating, said brake including a rotating section and a stationary section, said rotating section being attached to the housing of the speed reduction unit and having a first socket therein, a brake member mounted in the stationary section and movable into the socket to hold the rotating section against rotation relative to the stationary section, conduit means through which pressure fluid may be supplied to the motor including, a second socket in the rotating section and a flow tube movably mounted in the stationary section for movement into sealing engagement with the second socket in the rotating section when the brake member is positioned in the first socket and for moving out of engagement with the second socket when the brake member is moved out of the first socket to permit the rotation of the housing of the speed reduction unit, and means for manually rotating the housing of the speed reduction unit to drive the output shaft when the brake member is out of the first socket.

22. The combination according to claim 21 in which the flow tube is moved into engagement with the second socket concomitantly with the movement of the brake member into the first socket.

23. The combination of claim 22 further provided with an exhaust conduit for the pressure fluid supplied to the motor including a third socket in the rotating section of the brake and a second flow tube movably mounted in the stationary section and movable into and out of sealing engagement with said third socket.

24. A combination manual and power operated drive mechanism comprising, in combination, a self-locking speed reduction unit having a housing, an input shaft, and an output shaft, means rotatably supporting the housing, brake means for holding the housing against rotation including a rotatable section attached to the speed reducer housing and provided with a socket and a stationary section equipped with a brake member movable into the socket to hold the rotatable section from rotating relative to the stationary section and out of the socket to permit the rotation of the rotatable section relative to the stationary section, an electric motor having a stator attached to the housing of the speed reduction unit and a rotor for driving the input shaft, means for connecting the motor to a source of electrical power when the brake member is in the socket including stationary contacts carried by the stationary section and movable contacts carried by the movable section, said movable contacts being provided with a cam member positioned to be engaged by the brake member, as it moves into the socket, to move the movable contacts into engagement with the stationary contacts.

25. The combination according to claim 24 further provided with resilient means for moving the movable contacts out of engagement with the stationary contacts when the brake member has been moved out of the socket and out of engagement with the cam member.

References Cited by the Examiner

UNITED STATES PATENTS

| | | | |
|---|---|---|---|
| 2,300,343 | 10/1942 | Clay | 74—675 |
| 2,420,552 | 5/1947 | Morrill | 74—626 |
| 2,959,983 | 11/1960 | Wise | 74—626 |

FRED C. MATTERN, Jr., *Primary Examiner.*

W. S. RATLIFF, *Assistant Examiner.*